March 19, 1968  R. M. SIMPSON  3,373,642
HYDRAULICALLY REGULATED WORKPIECE ACCELERATING DEVICE
Filed Feb. 9, 1966
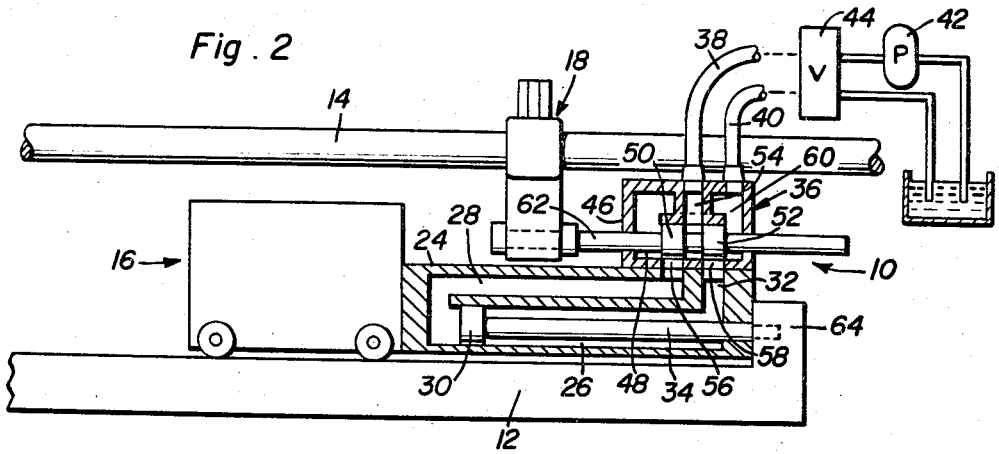
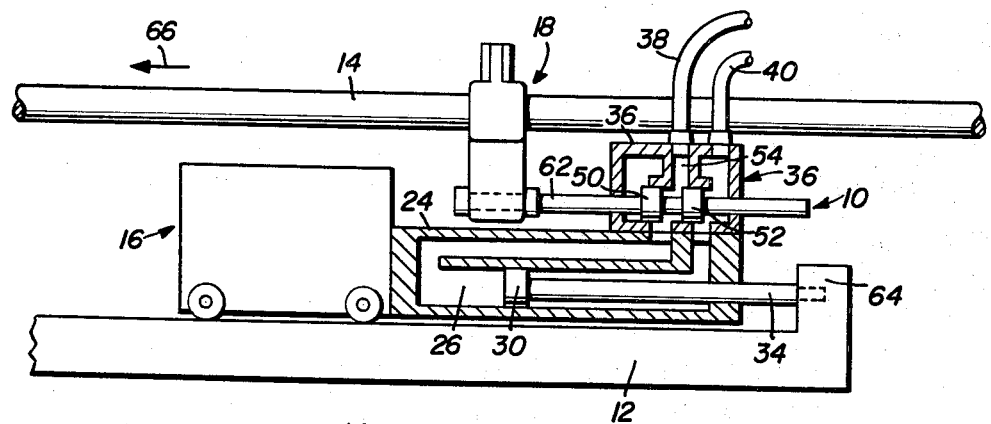
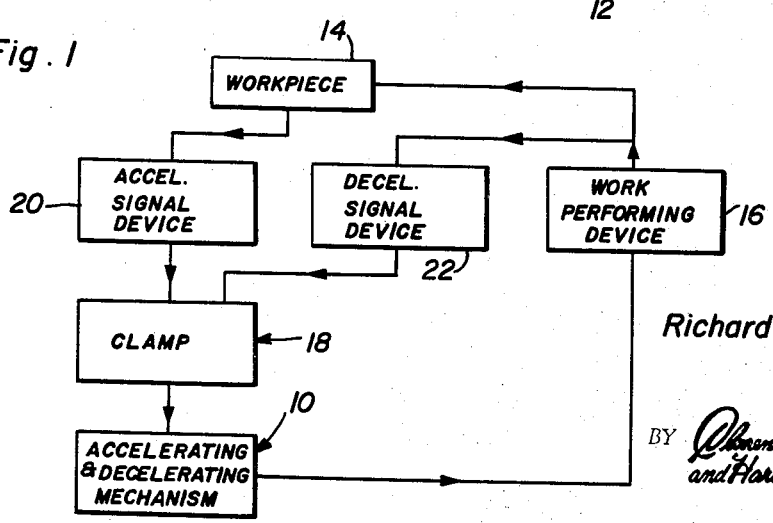
Richard M. Simpson
INVENTOR.
BY Clarence A. O'Brien
and Harvey B. Jacobson
Attorneys United States Patent Office 3,373,642
Patented Mar. 19, 1968

3,373,642
HYDRAULICALLY REGULATED WORKPIECE
ACCELERATING DEVICE
Richard M. Simpson, Twinsburg, Ohio, assignor to Ferro Dynamics, Inc., a corporation of Ohio
Filed Feb. 9, 1966, Ser. No. 526,213
5 Claims. (Cl. 83—76)

This invention generally relates to motion controlling devices and more particularly to the acceleration and deceleration of a mass relative to a continuously moving object or workpiece in connection with operations to be performed on the workpiece.

It is therefore a primary object of the present invention to provide a motion controlling system having a mechanism for regulating the acceleration and deceleration of a work performing device relative to a continuously moving workpiece. The present invention therefore, is generally useful in connection with work performing processes such as cutting, shearing, die stamping, etc.

An additional object of the present invention is to provide a motion controlling device which is operative to accelerate a mass up to a predetermined velocity of a continuously moving object, maintaining the mass moving at the velocity of the object for a predetermined interval after which the mass is decelerated.

These together with other objects and advantages which will become subsequently apparent reside in the details of construction and operation as more fully hereinafter described and claimed, reference being had to the accompanying drawings forming a part hereof, wherein like numerals refer to like parts through out, and in which:

FIGURE 1 is a schematic block diagram showing a motion controlling system with which the present invention is concerned.

FIGURE 2 is a simplified side elevational view with parts shown in section of the acceleration regulating device in one operative condition thereof.

FIGURE 3 is a side elevational view similar to FIGURE 2 but showing the device in another operative position.

Referring now to the drawings in detail, FIGURE 2 depicts the accelerating control device of the present invention generally denoted by reference numeral 10 in one typical installation illustrated in a somewhat diagrammatic or simplified manner. The accelerating device is therefore mounted and guided for movement along a fixed path on a frame 12, the path of movement being parallel to the path of movement of an object or workpiece 14. The workpiece may be stock such as a tube, a rod or a strip in a processing line which is being continuously moved at a constant velocity during the time that the workpiece is being cut, formed or processed by a work performing device represented by the mass 16 in FIGURE 2. The mass 16 may therefore represent devices such as cutoff mechanisms, dies or shears necessary to perform some particular work on the workpiece 14. The work must however be performed while the work performing device 16 is traveling at the same velocity as the workpiece so that there will be no relative motion between the workpiece and the mounting frame of the work performing device. Accordingly, the accelerating device 10 of the present invention is designed to accelerate the mass 16 from a position of rest to the velocity of the workpiece and then maintain the mass moving at the constant velocity of the workpiece until the work has been completed at which time the mass 16 is decelerated. Toward this end, a clamp device 18 is provided for engagement with the workpiece in order to transmit the motion thereof to the accelerating device 10. Thus, the work performing cycle is begun by engagement of the clamp with the workpiece and completed upon disengagement of the clamp device.

As shown in FIGURE 1, an accelerating signal device 20 is associated with the motion controlling system so that when the workpiece reaches a predetermined station, an accelerating signal will be dispatched to the clamp device 18 causing engagement thereof with the workpiece. When the clamp 18 is engaged, it is operative through the accelerating and decelerating mechanism 10 to impart movement to the work performing device 16 so that when the work performing device has acquired the velocity of the workpiece, it may perform its operations on the workpiece. Upon completion of the work, the work performing device may trigger a deceleration signal device 22 from which a signal is dispatched to the clamp device 18 causing it to disengage. Upon disengagement of the clamp device 18, the work performing device 16 is decelerated under control of the mechanism 10.

The accelerating and decelerating device 10 includes a housing 24 which is connected to the mass 16 so as to impart movement thereto in a direction generally parallel to the path of movement of the workpiece 14. Accordingly, the housing is provided with a fluid piston chamber 26 elongated in a direction parallel to the path of movement of the workpiece. Also formed within the housing 24, is a fluid supply passage 28 communicating with the fluid chamber 26 on one side of a piston 30, the chamber on the other side of the piston 30 being in fluid communication with a passage 32. The housing 24 and piston 30 therefore form a fluid displacing assembly arranged to accelerate and decelerate the mass 16 by supply of fluid under pressure to the fluid chamber causing movement of the housing 24 relative to the frame 12. The piston 30 is therefore fixedly mounted on the frame by means of the piston rod 34 connected at one end to the piston 30 and anchored at its opposite end to the end portion 64 of the frame.

Fluid under pressure is supplied through a servo valve mechanism 36 to the housing 24 by means of flexible conduits 38 and 40. The conduits may therefore be connected to a source of fluid under pressure including for example the diagrammatically illustrated pump 42 connected to the conduits through a reversing valve 44. The supply and exhaust of fluid to and from the housing 24 in order to accelerate and decelerate the mass 16 is therefore controlled by the servo valve device 36.

The servo valve device includes a valve body 46 fixedly mounted on the housing 24 for movement therewith. The valve body is provided with an axial valve bore 48 generally parallel to the path of movement of the workpiece for slidably mounting a valve element including the valve lands 50 and 52. The valve body also forms therewithin an inlet passage 54 to which the conduit 38 is connected and an outlet port 56 connected to the passage 28 within the housing 24. Another outlet port 58 is also formed in the valve body in alignment with the passage 32 in the valve housing. Accordingly, the outlet ports 56 and 58 respectively communicate with the fluid chamber 26 on opposite sides of the piston 30. A cavity 60 is also formed within the valve body in communication with the conduit 40 and the left side of the valve land 50 as viewed in FIGURE 2. Connected to the valve element is a valve actuating rod 62 to which the clamp device 18 is connected. It will therefore be apparent, that the valve element is actuated by the clamp device while it undergoes movement relative to the valve body, this occurring in response to engagement and disengagement of the clamp device with the continuously moving workpiece 14.

In the position shown in FIGURE 2, the clamp device 18 is disengaged from the workpiece so that the valve lands 50 and 52 assume the positions illustrated blocking or closing the outlet ports 56 and 58. The conduit 38 then supplies fluid under pressure to the inlet passage 54 while the conduit 40 connects the cavity 60 to sump so as to establish a low pressure region therewithin. In this condition of the accelerating device 10, the housing 24 is at one end of its stroke relative to the piston 30 abutting the end portion 64 of the frame. Thus, in the disengaged condition of the clamp device 18, the mass 16 will be held stationary by fluid trapped within the housing on the left side of the piston 30 as shown in FIGURE 2.

When the clamp device 18 is engaged to initiate a work cycle, movement is imparted thereto at the velocity of the workpiece in the direction indicated by the arrow 66 in FIGURE 3. The clamp device then imparts movement to the valve element through the actuating rod 62 so that the valve lands thereof move toward a position relative to the valve body 46 as shown for example in FIGURE 3. The outlet port 56 is thereby gradually opened by the valve land 50 at the same time that the valve land 52 throttles the inlet passage 54 in order to supply fluid at a regulated pressure to the fluid chamber 26 on the left side of the piston 30 in order to impart displacement of the housing 24 in a direction away from the end portion 64 of the frame. Thus, before the valve element is moved to the end of its displacement stroke within the valve body, fluid pressure supplied to the housing 24 accelerates the mass 16 from a position of rest. While the outlet port 56 is being uncovered by the valve land 50, the outlet port 58 is also being uncovered by the valve land 52 in order to permit exhaust of fluid from the fluid chamber on the right side of the piston 30. Thus, engagement of the clamp device 18 will produce limited relative movement between the clamp device and the servo valve 36 during which time the mass 16 is being accelerated. When the housing 24 and the mass 16 have acquired the velocity of the workpiece 14 relative movement between the clamp device 18 and the servo valve 36 will cease and the housing 24 will continue moving the mass 16 at the same velocity as the workpiece. At the completion of the work cycle, the clamp device 18 is disengaged at the same time that the connections within the reversing valve 44 are reversed. Forward movement of the mass and housing connected thereto is then decelerated by virtue of the supply of fluid under pressure to the right side of the piston 30 through conduit 40 and passage 32, while the left side is vented through passage 28 and conduit 38. The cavity 60 within the valve body is now pressurized so as to displace the clamp device in a return direction relative to the valve body. The fluid under pressure supplied to the housing at the same time decelerates the mass and then begins to impart movement thereto in a return direction in order to restore the mechanism 10 to the position illustrated in FIGURE 2. The reversing valve 44 is then restored to its initial condition in preparation for a new work cycle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. In a system for controlling the movement of a massive device to perform an operation on a continuously moving workpiece engageable by a signal controlled clamp, an acceleration control mechanism connected to said device for imparting movement thereto comprising, a housing connected to said device having a fluid chamber elongated generally in a direction parallel to the path of movement of said workpiece, a piston slidably received in said chamber, frame means fixedly mounting said piston and guiding movement of said housing along a path generally parallel to said chamber, a source of fluid under pressure, servo valve means mounted on the housing and connecting said source to the fluid chamber for displacement of the device relative to the piston, and valve actuating means connecting the valve means to the clamp for varying the pressure of the fluid in said chamber in response to engagement of the clamp with the workpiece.

2. The combination of claim 1 wherein said valve means comprises, a valve body having an inlet port connected to the source, a pressure port connected to the fluid chamber on one side of said piston and a vent port connected to the chamber on the other side of the piston, a valve element movably mounted in said valve body for movement between positions closing and opening said pressure port, said valve element having pressure throttling means simultaneously opening the vent port and closing the inlet port in response to displacement of the valve element from the closing to the opening position by said valve actuating means.

3. In combination with an object moving at a predetermined velocity along a fixed path, means for accelerating a mass from a position of rest comprising, fluid displacement means connected to the mass for transmitting movement thereto at the velocity of the object, clamp means engageable with said object for limited displacement relative to the fluid displacement means, and valve means operatively connecting the clamp means to the fluid displacement means for imparting movement to the mass in response to said limited displacement of the clamp means relative to the fluid displacement means to gradually accelerate the mass to said velocity of the object and decelerate the mass upon disengagement of the clamp means.

4. The combination of claim 3 wherein said fluid displacement means comprises, a housing connected to the mass and having a fluid chamber elongated in a direction parallel to said fixed path and a piston in said chamber, frame means fixedly mounting said piston and guiding movement of said housing along a path generally parallel to said chamber, a source of fluid under pressure connected by said valve means to the fluid chamber.

5. The combination of claim 4 wherein said valve means comprises, a valve body having an inlet port connected to the source, a pressure port connected to the fluid chamber on one side of said piston and a vent port connected to the chamber on the other side of the piston, a valve element movably mounted in said valve body for movement between positions closing and opening said pressure port, said valve element having pressure throttling means simultaneously opening the vent port and closing the inlet port in response to displacement of the valve element from the closing to the opening position by said clamp.

References Cited

UNITED STATES PATENTS 2,295,161 9/1942 Clay _____ 91—216 X
3,178,974 4/1965 Roess _____ 83—76

ANDREW R. JUHASZ, *Primary Examiner.*